J. H. BREWER.
PIE CRIMPER.
APPLICATION FILED MAY 29, 1917.

1,265,600.

Patented May 7, 1918.

WITNESSES
J. H. Crawford

INVENTOR
J. H. Brewer,
BY Victor J. Evans
ATTORNEY

UNITED STATES PATENT OFFICE.

JOHN H. BREWER, OF SILVERTON, OREGON.

PIE-CRIMPER.

1,265,600.  Specification of Letters Patent.  Patented May 7, 1918.

Application filed May 29, 1917. Serial No. 171,747.

*To all whom it may concern:*

Be it known that I, JOHN H. BREWER, a citizen of the United States, residing at Silverton, in the county of Marion and State of Oregon, have invented new and useful Improvements in Pie-Crimpers, of which the following is a specification.

This invention relates to tools, comprehending particularly pie crimping tools.

The primary object of the present invention is the provision of a tool of the above stated character, so designed to readily press together the edges of the pie crust and simultaneously trim the edge of the pastry protruding over the edge of the pan.

A further object of the invention is the provision of a tool which is simple in construction, durable in use, may be manufactured and sold at a comparatively low cost, and one wherein means is provided for perforating the pie crust.

With the above and other objects in view, the invention consists in the novel features, details of construction and combination of parts which will hereinafter be more fully set forth, illustrated in the accompanying drawing and pointed out in the appended claim.

Figure 1:
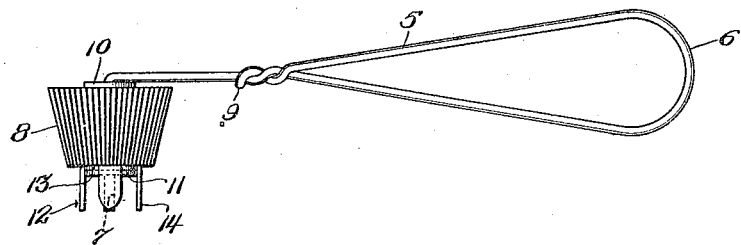
Figure 1 is a front elevation of the tool embodying my invention.
Figure 2:
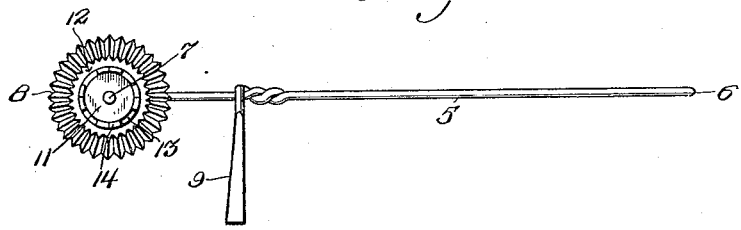
Fig. 2 is a side elevation.

Referring more particularly to the drawing, 5 denotes a flexible strand of material bent at its intermediate portion to provide a looped handle 6, one end of the handle being projected at right angles thereto and flattened to provide on the end of the handle a cutting blade, the opposite end of the handle terminating in an L-shaped shank 7 having journaled on its horizontal end or portion a crimping roll 8, adapted for rotation, consequently in the use of the tool this crimping roll serves to press the edge of the crust together, and the dough or pastry protruding over the edge of the pan is severed from the crust by the blade 9. This crimping roll is of substantially conical form, and may be constructed of any material found so desired, and when mounted on the angular shank portion of the handle, the displacement of the same therefrom is prevented by the disks 10 and 11.

Mounted on the horizontal shaft of the shank of said handle between the disk 11 and the outer end of the crimping roll, is a perforator 12 constructed from a single blank of material provided with a body portion 13 extending from which at opposite diametric points is a series of prongs 14.

Figure 3:
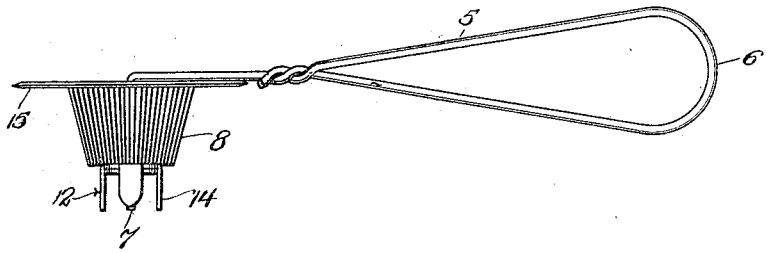
Fig. 3 is a view similar to Fig. 1, illustrating a slightly modified form of cutter.

The modified form of tool in Fig. 3 of the drawing is identical in all respects to that form disclosed in the preferred embodiment of the invention, other than in place of forming the cutting blade contiguous with the handle, the disk 10 is enlarged to a diameter exceeding the diameter of the inner end of the crimping roll to permit of the marginal edge of the disk projecting beyond the periphery of the crimping roll, as indicated by the character 15.

From the foregoing description, taken in connection with the accompanying drawings, the advantages of construction and the method of operation will be readily apparent to those skilled in the art of which the invention relates, and while I have described the principles of operation of the invention, together with the device which I now consider to be the best embodiment thereof, I desire to have it understood that the device shown is merely illustrative, and that such changes may be made when desired as are within the scope of the appended claim.

What is claimed as new, is:—

As a new article of manufacture, a pie crimper comprising a single strand of material bent to provide a looped handle, an L-shaped shank formed on said handle, a cutting member formed integral with the handle at the point of intersection of the shank therewith, a crimping roll journaled on the horizontal portion of the L-shaped shank for rotary movement, a disk on the free end of said shank, and a prong member arranged on the shank of the handle exteriorly of the crimping roll and inwardly of said disk, substantially as and for the purpose specified.

In testimony whereof I affix my signature.

JOHN H. BREWER.

Copies of this patent may be obtained for five cents each, by addressing the "Commissioner of Patents, Washington, D. C."